(No Model.)
W. D. BROOKS.
CAN SOLDERING MACHINE.
No. 400,294. Patented Mar. 26, 1889.
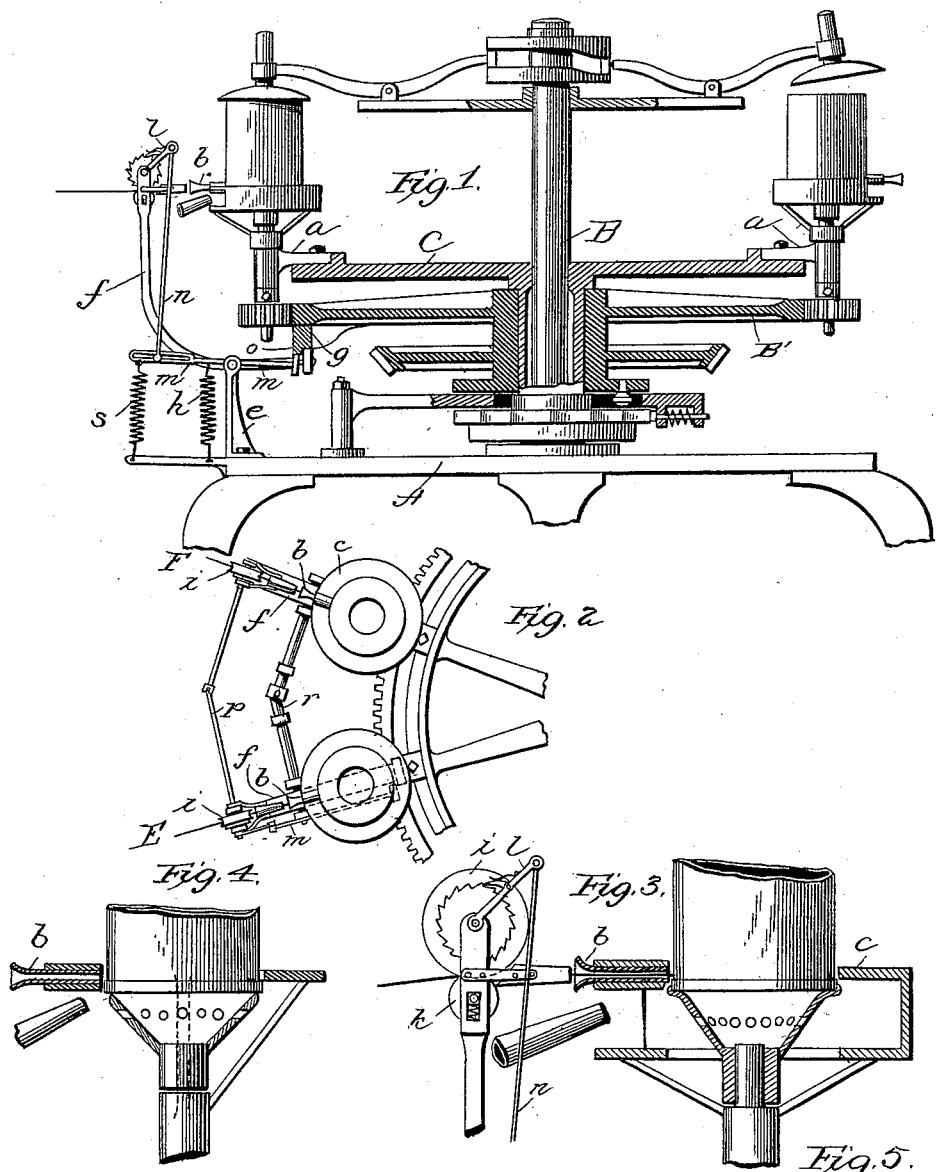
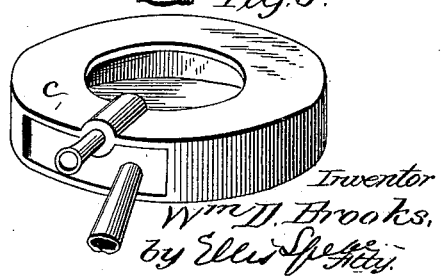

UNITED STATES PATENT OFFICE.

WILLIAM D. BROOKS, OF BALTIMORE, MARYLAND.

CAN-SOLDERING MACHINE.

SPECIFICATION forming part of Letters Patent No. 400,294, dated March 26, 1889.

Application filed December 27, 1888. Serial No. 294,774. (No model.)

*To all whom it may concern:*

Be it known that I, WILLIAM D. BROOKS, of Baltimore, in the State of Maryland, have invented a new and useful Improvement in Can-Soldering Machines; and I do hereby declare that the following is a full, clear, and exact description of the same.

My present invention relates to can-soldering machines, and particularly to the feeding of solder to the cans in their movement past the solder-station. I have shown the invention as applied to that class of can-soldering machines in which a revolving table is used carrying rotating can-seats, the table being adapted to have intermittent or step-by-step movement; but it will be understood that the invention may be applied with equally good results to an endless-chain carrier, which is another well-known form of can-soldering machines.

The object of my invention is to provide a solder-feeding mechanism which will automatically feed the solder to the can in the pause of every can-seat before the solder-station, and at the same time provide for the passage of each can-carrier without interruption by the solder-feeding devices.

Another object is to provide a plurality of solder-feeding devices, whereby a can may be soldered by successive applications; or, if desired, a can can be completely soldered at each station, and thus increase the capacity of the machine.

Another object is to provide a plurality of soldering devices with means operated by the machine for causing the feeding of one set of devices and intermediate mechanism to the other devices for causing the feeding thereof.

A fourth object is to improve the construction and arrangement of the top plate of the flame-chamber in connection with the feeding of solder, so as to feed the solder to the can directly in line with the edge of the lower flange, and at the same time secure the greatest amount of heat for the can edge.

The invention, finally, has for its object to provide an effective construction of feeding devices for feeding forward the solder.

In the drawings, Figure 1 is an elevation, partly in section, of a soldering-machine of the class referred to and heretofore shown in patents granted me, my improved solder-feeding mechanism being shown on the left-hand side of the figure. Fig. 2 is a plan view of a portion of a table, representing the arrangement of the plurality of solder-feeding devices. Fig. 3 is a section of a flame-chamber and can-carrier representing a detail of the construction of the upper plate and a portion of the feeding mechanism in side elevation in its relation to the carrier. Fig. 4 is a modification representing the flame-chamber as composed of a single plate. Fig. 5 is a perspective view of the ordinary flame-chamber with my solder-tube applied thereto.

The table of the machine is represented at A, the post at B, and the rotating table at C. This table supports the brackets for the can-seats, as shown at *a*, and the can-seats themselves are rotated by a master-wheel, B', having a geared periphery which meshes with small gear-wheels secured to the lower ends of the spindles of the can carriers or seats. The movement of the table C, it will be understood, is intermittent, while that of the master-wheel is continuous, and not only the construction, but the operation, of these parts are well known, and do not require particular description and explanation.

In connection with my soldering devices I prefer to use vertically-arranged carriers, and I may use the form of flame-chambers shown in Figs. 3 and 5, and which has been heretofore patented to me by Letters Patent No. 228,846; or I may use, though not with as perfect results, simply an annular ring, as in Fig. 4, which serves as a shield to protect the can, though a great deal of heat is wasted, as there is no chamber to confine it, as in the construction shown in Figs. 3 and 5, and for this reason I prefer the form shown in the figures last named. As it is desirable to subject the can to an intense heat during the soldering operation, which is of short duration, in order to allow the soldering to be effected perfectly and uniformly, I locate the delivery-tube in the upper plate of the flame-chamber, as shown at *b*, so as to have the solder fed directly in line with the upper edge of the flange. I have provided an improved construction of the upper plate, *c*, of the flame-chamber for this purpose. The normal position of the can-seat is slightly below the plate $c$, in the opening formed in the center thereof, for the purpose of preventing the displacement of the can in its rotation before the holding-cap clasps it at the top, and this also presents the edge of the can to the best advantage to receive the impinging flame from the burners, which are so located as to direct the heat directly beneath the plate $c$ and against the corner of the can. The opening in the center of the plate $c$ is of such a size that the can fits it, so as to have only sufficient room to be displaced without binding at the point of discharge, and this forms, in the construction of chamber shown in Figs. 3 and 5, a practically closed chamber which retains the heat, and thus is adapted to heat the can quickly and to keep it so heated. It is therefore desirable to retain the relative position of the can and the top plate for the reasons I have given, and I aim to do this in my present construction and at the same time to feed the solder in a direct line with the upper edge of the flange and in proximity to the flame-tube, so that where the solder is applied will not only be the proper point, but also the point which has just left the position of the flame-tube, and no cooling effect can be produced, for the reason that the can practically forms the top of the chamber and the edge of the flange is beneath the top plate, $c$, and therefore not exposed to the modifying influence of the outer air. I secure this effect by forming the upper plate, $c$, with a bulge above and below, and I bore through this bulged place, making a central opening, which, when the can is in place in its seat, is in direct line with the upper edge of the flange, and the solder is directly deposited at this point on the can and the heat sweats it in thoroughly. This opening may constitute the feed-opening for the solder, or a tube having a flaring mouth may be inserted therein, as shown in Fig. 3 at $b$. This tube or the opening I prefer to make of or line with a suitable non-conducting material, such as lava.

My improved feeding devices I show more particularly in Figs. 1 and 3. On a standard, $e$, on the table A, I pivot a rocking arm, $f$, which has a curved extension, with its end in vertical plane and in line with the opening in the feed-tube $b$. The other end of this arm $f$ extends beneath the rim of the master-wheel and carries an anti-friction pulley, which is adapted to be depressed to rock the upper end of the arm $f$ forward by means of a cam, $g$, on the said wheel. After it has been so moved forward the arm is retracted to its normal position by means of a spring, $h$. It will be understood that as the solder-tube $b$ is carried by the top plate, $c$, and moves with it in the rotation of the table C it is necessary that the solder which is left in the tube must be withdrawn from it before the rotation of the table C begins after its pause, or else the solder will be broken off or bent aside. The rocking of the arm $f$ provides for this, and in its normal position the end of the solder is in line with the outer end of the tube $b$; but as the arm $f$ is rocked forward this movement is sufficient to feed the solder in to near the inner end of the tube $b$, and the feeding mechanism then operates almost, if not quite, simultaneously with the rocking of the arm $f$ to cause the solder to be fed directly against the can. This feeding mechanism is supported by the arm $f$ and consists of a feed-wheel, $i$, having a ratchet secured thereto, the feed-wheel having a grooved periphery and a second pressure-wheel, $k$, being located directly beneath it, so as to place the necessary friction upon the solder-wire to cause it to be fed forward under the rotation of the feed-wheel $i$. A pawl is carried upon an arm, $l$, and is in engagement with the ratchet of the wheel $i$, and this pawl is operated through a lever, $m$, also pivoted on the post $e$ and provided with an arm $m$ connecting the outer end of the lever $m$ with the upper end of the pivoted lever $l$.

The end of the lever $m$ is slotted, and the arm $n$ has an adjustable connection therewith, so that the amount of feed may be regulated. The inner end of the lever $m$ is provided with an anti-friction roller, and this is in contact at intervals with a cam, $o$, on the master-wheel, which thus depresses the inner end of the lever $m$ and through the connections described operates the feed-wheel $i$, to feed forward the solder. A suitable spring, $s$, retracts the lever $m$. As soon as the cams $g$ and $o$ have passed, the arm $f$ is immediately retracted by its spring $h$, and the end of the solder-wire is withdrawn from the tube $b$, and the carrier is allowed to move on.

I have found it desirable to provide a plurality of solder-feeding devices, so that I may apply the solder successively—that is to say, partly solder a can at one station and complete it at the next or the third or fourth station, as may be found desirable; or, instead of applying the solder successively, the intermittent movement of the table can be increased, so as to be equal to the distances between two or more stations and each station be adapted to completely solder the can that stops before it, and in this manner the capacity of the machine can be increased. As it would not be desirable to have independent connections from each solder-station to the machine such as I have described above, I provide, as shown in Fig. 2, intermediate connections from the journal of the rocking arm and from the feed-wheel directly operated by the cams to the arm and feed-wheel at the second station and to as many others as may be provided. These connections simply consist of divided shafts $p$ and $r$, the shaft $p$ extending from the feed-wheel of station E to the feed-wheel of station F, and the connection $r$ extending in like manner from the rocking arm of station E to the rocking arm of station F. The shafts $p$ and $r$ are divided and have universal joints in the center, as shown clearly in Fig. 3.

I claim as my invention—

1. In a can-soldering machine, a rotating support for the can-carriers, means for revolving the cans carried by the said carriers, solder-feeding devices supported in line with the carriers, a movable support for said feeding devices, and means for moving the support to and from the table, substantially as described.

2. In a can-soldering machine, a plurality of solder-feeding devices, movable supports for said devices, means for moving said supports, and means for operating the feeding devices of the series simultaneously, substantially as described.

3. In a can-soldering machine, a solder-feeding device, a movable support therefor, means for automatically moving the feeding devices forward, and means for feeding the solder at the same time, substantially as described.

4. In a can-soldering machine, a plurality of solder-feeding devices, movable supports for the same, connections from one of said supports and from one of said feeding devices to the machine for automatically operating the same, and intermediate connections from said support and said feeding devices to the other supports, and feeding devices of the series for operating the same by the operation of the first-named support and device, substantially as described.

5. In a can-soldering machine, a rocking support for the solder-feeding devices, consisting of an arm, $f$, a solder-feeding device carried on the upper end thereof, a cam on the master-wheel for operating the arm $f$, a cam, $o$, and connections from said cam to the solder-feeding devices, substantially as described.

6. In combination with a can-seat, a plate, $c$, arranged above the level of the said seat, a bulge formed on said plate, and an opening through the center of the bulge for applying solder to the can, substantially as described.

7. In combination with a revolving can-seat, a flame-chamber therefor, the top plate, $c$, of which is slightly above the level of the seat, a bulge formed on said top plate, and an opening through the same for directing solder to the can, substantially as described.

In testimony whereof I have signed my name to this specification in the presence of two subscribing witnesses.

WM. D. BROOKS.

Witnesses:
FRANK L. MIDDLETON,
JAMES M. SPEAR.